United States Patent
Akiyama et al.

(10) Patent No.: US 6,842,108 B2
(45) Date of Patent: Jan. 11, 2005

(54) POWER SUPPLY INTEGRATED CIRCUIT HAVING COMMUNICATION FUNCTION

(75) Inventors: Susumu Akiyama, Kariya (JP); Takayuki Toya, Kariya (JP)

(73) Assignee: Denso Corporation, Kariya (JP)

( * ) Notice: Subject to any disclaimer, the term of this patent is extended or adjusted under 35 U.S.C. 154(b) by 416 days.

(21) Appl. No.: 10/158,928

(22) Filed: Jun. 3, 2002

(65) Prior Publication Data

US 2003/0025594 A1 Feb. 6, 2003

(30) Foreign Application Priority Data

Jul. 31, 2001 (JP) .................................. 2001-231674

(51) Int. Cl.⁷ ............................................. H04M 11/04
(52) U.S. Cl. ............................ 340/310.01; 340/310.03; 340/538
(58) Field of Search ................. 340/310.01, 310.03, 340/310.06, 531, 538; 180/54.1; 701/36

(56) References Cited

U.S. PATENT DOCUMENTS

| | | | |
|---|---|---|---|
| 4,573,041 A | 2/1986 | Kitagawa et al. | ............ 340/538 |
| 5,745,027 A * | 4/1998 | Malville | ................ 340/310.01 |
| 6,127,939 A * | 10/2000 | Lesesky et al. | ............. 340/438 |
| 6,229,434 B1 * | 5/2001 | Knapp et al. | ........... 340/310.01 |
| 6,373,375 B1 * | 4/2002 | Hoetzel et al. | ......... 340/310.01 |
| 6,791,207 B2 * | 9/2004 | Yoshida et al. | ............ 307/10.1 |

FOREIGN PATENT DOCUMENTS

| | | |
|---|---|---|
| JP | A-56-160144 | 12/1981 |
| JP | A-59-54349 | 3/1984 |
| JP | A-60-88318 | 5/1985 |
| JP | A-61-224636 | 10/1986 |
| JP | A-63-19934 | 1/1988 |
| JP | A-4-300743 | 10/1992 |
| JP | A-07-050619 | 2/1995 |
| JP | A-9-118182 | 5/1997 |
| JP | A-2000-164808 | 6/2000 |

* cited by examiner

Primary Examiner—Toan N. Pham
(74) Attorney, Agent, or Firm—Posz & Bethards, PLC

(57) ABSTRACT

A power supply integrated circuit is provided which makes it possible to make an on-vehicle apparatus compact and to allow power supply cable communication having resistance to noise. The power supply integrated circuit is connected to a micro-controller incorporated in an ECU and a power supply cable. The power supply integrated circuit has an LPF and a regulator. The power supply integrated circuit also has an interface circuit, a BPF, a transmitting section, and a receiving section. The LPF passes only the power supply voltage, and the BPF passes only transmission signal.

4 Claims, 2 Drawing Sheets

POWER SUPPLY INTEGRATED CIRCUIT HAVING COMMUNICATION FUNCTION

CROSS REFERENCE TO RELATED APPLICATION

This application is based on and incorporates herein by reference Japanese Patent Application No. 2001-231674 filed Jul. 31, 2001.

FIELD OF THE INVENTION

The present invention relates to a power supply integrated circuit used in an apparatus loaded on a vehicle for performing data communication with other apparatus through a power supply cable provided in the vehicle.

BACKGROUND OF THE INVENTION

Various apparatuses such as controllers, information apparatus, and audio apparatus are loaded on vehicles. This results in a need for co-operations and information sharing between on-vehicle apparatuses.

For this reason, a network for information communication is constructed by connecting an on-vehicle apparatus which must co-operate and share information among various apparatuses loaded on a vehicle with a dedicated communication line such that information can be transmitted and received between the apparatuses (on-vehicle LAN).

However, the number of networks constructed on a vehicle recently increases as a result of increases in the number and types of on-vehicle apparatuses or improvements of functions of on-vehicle apparatuses. There is also a trend toward smaller vehicle sizes as a result of increases in the price of fuel. This has made it difficult to incorporate on-vehicle apparatuses in a vehicle by providing a communication line for each of networks in the vehicle.

In order to solve this inconvenience, it is proposed to use a power supply cable provided to supply power to each on-vehicle apparatus from a battery as a communication line. This is referred to as power supply cable communication.

However, the number of apparatuses that can be loaded on a vehicle will be limited unless the size of on-vehicle apparatuses is reduced. When the electrical apparatuses as on-vehicle apparatuses increases, noise in a vehicle becomes more severe, which increases instances in which errors can occur in communication in a network.

For example, when a pattern connecting a data communication section and a power supply section is formed on a printed circuit board (substrate) in an on-vehicle apparatus to supply power from the power supply section to the data communication section, noise enters through the pattern and adversely affects the on-vehicle apparatus. The noise is also released from the pattern to adversely affect the on-vehicle apparatus.

SUMMARY OF THE INVENTION

The present invention has an object to provide a power supply integrated circuit, which enables reduction of size of vehicle apparatuses and allows power supply cable communication that is resistant to noises.

According to the invention, a power supply IC having a constant voltage power supply unit for converting a power supply voltage supplied through a power supply cable provided on a vehicle into a predetermined DC constant voltage and supplying the same to internal circuits incorporates a data communication unit for performing data communication with other apparatuses through the power supply cable. That is, according to the invention, the constant voltage power supply unit and the data communication unit are integrated into a single power supply IC which can be incorporated in an on-vehicle apparatus for performing data communication with other apparatus through the power supply cable.

Therefore, the use of the power supply IC makes it possible to reduce the size of an on-vehicle apparatus. Since there is no need for wiring between the constant voltage power supply unit and the data communication unit, the use of the power supply IC makes it possible to improve the resistance of an on-vehicle apparatus to noise.

The power supply voltage supplied through the power supply cable may be a DC power supply voltage or AC power supply voltage. For example, on a vehicle in which the power supply cable is connected to a battery, a DC power supply voltage is supplied to the power supply cable. On a vehicle (such as an electrical automobile) in which the power supply cable is connected to a motor for generating power, an AC power supply voltage is supplied to the power supply cable.

When an on-vehicle apparatus uses a power supply IC having only a constant voltage power supply unit and a data communication unit incorporated therein, in addition to the power supply IC, it is necessary to provide a filter unit between the power supply cable and the power supply IC, for blocking passage of transmission signals (or communication signals) for data communication and selectively allowing only the power supply voltage to pass between the power supply cable and the constant voltage power supply unit and blocking passage of the power supply voltage and selectively allowing only transmission signals (communication signals) to pass between the power supply unit and the data communication unit. Wiring for those units must be provided on the printed circuit board.

Therefore, the filter unit is preferably incorporated in the power supply IC to improve the resistance of the on-vehicle apparatus to noise as described in. This also makes it possible to reduce the size of the on-vehicle apparatus.

The data communication unit of the power supply IC may be constructed with a receiving section for restoring data from a transmission signal (communication signal) superposed on the power supply cable to input it to an internal circuit. Alternatively, the data communication unit may be constituted by the receiving section and a transmitting section for converting output data from the internal circuit into a transmission signal (communication signal) to transmit it onto the power supply cable. Obviously, the data communication unit may be constructed only by the transmitting section.

For example, when the inventive power supply IC is used in an information collection type on-vehicle apparatus which is not required to transmit communication signals to other apparatus connected to a power supply cable, it is required only to provide the data communication unit with the receiving section for receiving transmission signals (communication signals) from the other apparatus.

When the data communication unit is configured with the transmitting section and the receiving section, the power supply IC may have a specific configuration as described below.

The power supply IC is configured such that it blocks passage of the power supply voltage in a path of input of a transmission signal from the power supply cable to the receiving section to allow only a transmission signal (communication signal) for data communication to pass selectively. The transmitting section has a configuration in which it is directly connected to the power supply cable to transmit a transmission signal (communication signal) based on output data from an internal circuit onto the power supply cable.

Therefore, the use of the power supply IC makes it possible to achieve a further improvement of noise resistance of an on-vehicle apparatus for performing bi-directional data communication with other apparatus. It is also possible to minimize release of noise to other on-vehicle apparatus.

When the filter unit is implemented as an IC, since an element having a great inductance can not be incorporated, it is convenient to use an active filter as the filter unit, the active filter being capable of improving filter characteristics by amplifying an input signal using an operational amplifier.

Further, in the power supply IC, the data communication unit is preferably configured such that it performs data communication with other apparatus according to the frequency hopping method in which the frequency of a communication signal is periodically switched.

Since the frequency hopping method is a method of communication that is resistant to noise as is well-known, a manufacturer can suppress errors in communication between on-vehicle apparatus in a vehicle further by incorporating a power supply IC that employs the frequency hopping method as the method for communication with other apparatus in the vehicle.

When the frequency hopping method is employed, the transmitting section of the data communication unit may be constituted by a primary modulating portion for modulating a carrier wave based on output data from an internal circuit, a secondary modulating portion which has a variable oscillating part configured such that it oscillates at a variable frequency and a hopping pattern generating part for switching the oscillation frequency of the variable oscillating part in a predetermined pattern and which performs frequency conversion on an input signal from the primary modulating portion based on an input signal from the variable oscillating part and outputs a resultant signal as a transmission signal for data communication, and a transmitting part for transmitting the transmission signal transmitted from the secondary modulating portion onto the power supply cable.

The receiving section may be constituted by a secondary demodulating portion for performing frequency conversion on a transmission signal acquired from the power supply cable through the filter unit using a signal from the variable oscillating part whose oscillation frequency is switched based on a signal from the hopping pattern generating part for generating the same hopping pattern as that of the transmitter in synchronism with the transmission signal and a primary demodulating portion for restoring data based on a signal from the secondary demodulating portion and inputting it to an internal circuit.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
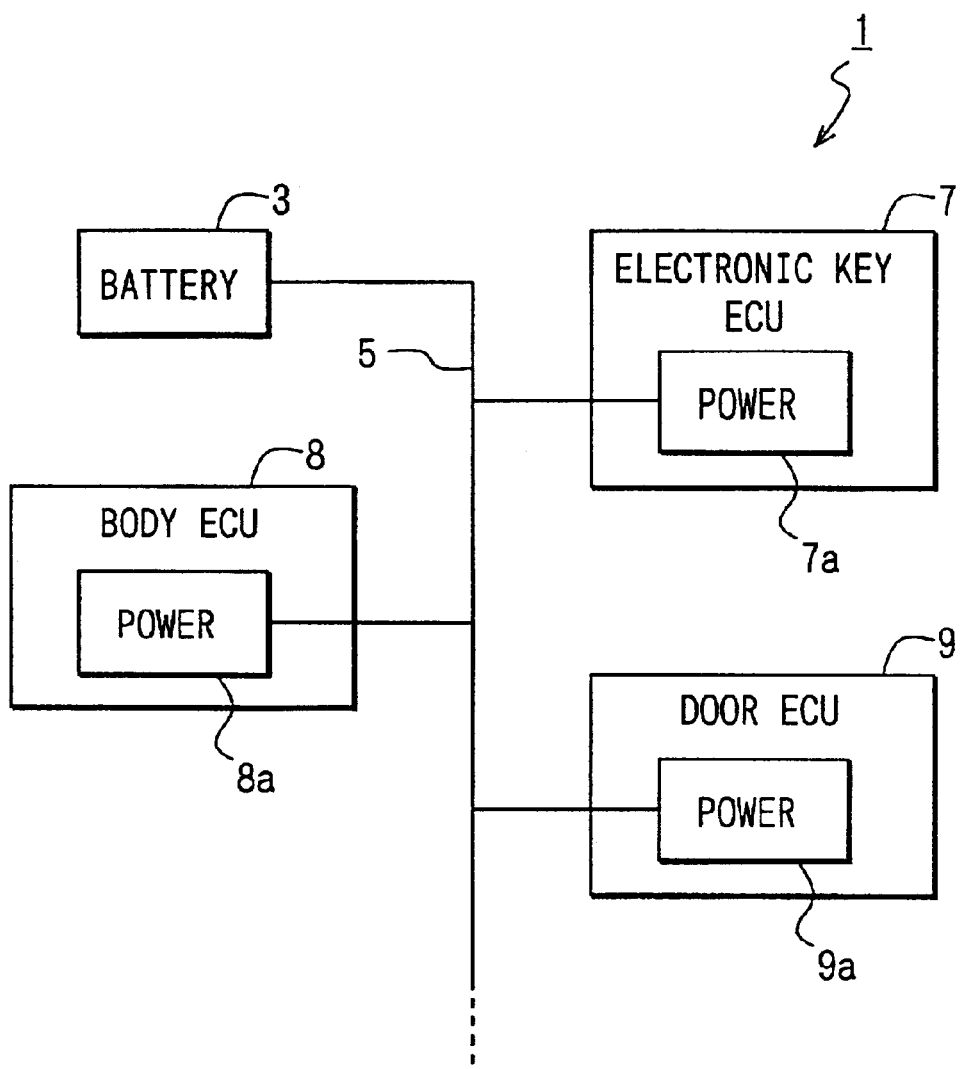
FIG. 1 is a block diagram showing an in-vehicle communication system using a power supply integrated circuit according to an embodiment of the invention.

Referring first to FIG. 1, an in-vehicle communication system 1 is constructed in a vehicle. Each of electronic control units (ECUs) such as an electronic key ECU 7, a body ECU 8, and a door ECU 9 having communicating functions as an on-vehicle apparatus is connected to a power supply cable 5 connected to a battery 3 that is a DC power supply.

Specifically, the power supply cable 5 supplies a DC power supply voltage from the battery 3 to each of the ECUs 7 through 9 and also serves as a communication line for communication between the ECUs 7 through 9. It transmits transmission signals (or communication signals) for data communication according to the frequency hopping method, which is well-known as a kind of the spread spectrum method. Each transmission signal is output from each of the ECUs 7 through 9 in a manner superposed on the power supply voltage.

The electronic key ECU 7 is a control unit that receives an electric wave transmitted by an electronic key and transmits information representing a command from the electronic key to the body ECU 8. It has internal circuits such as a receiver and a demodulation circuit, a controlling microcomputer for controlling various parts in the ECU represented by those circuits (micro-controller), and a power supply integrated circuit (IC) 7a. The ECU 7 supplies power to each of the internal circuits (such as the micro-controller) that form the unit itself through the power supply IC 7a connected to the power supply cable 5.

For example, when the ECU 7 receives an electric wave transmitted from the receiver (not shown) connected to the ECU itself, it inputs the wave to the demodulation circuit (not shown) incorporated therein and checks based on the result of demodulation whether the transmission wave has come from an electronic key for smart key entry using the micro-controller incorporated therein. When it is determined that the transmission wave has come from an electronic key, it transmits information representing a command from the electronic key from a frequency hopping type transmitting section incorporated in the power supply IC 7a to the power supply cable as a transmission signal having a predetermined hopping pattern P1.

The body ECU 8 is a control unit for commanding the door ECU 9 to lock or unlock doors according to the command information acquired from the electronic key ECU 7 and for activating an anti-theft ECU (not shown) when a passenger leaves the vehicle with the doors locked. The body ECU 8 is also configured such that it supplies power to each of internal circuits (such as a microcontroller) forming the ECU itself through a power supply IC 8a connected to the power supply cable 5 and controls a frequency hopping type transmitting section and receiving section incorporated in the power supply IC 8a using the microcontroller to communicate with the ECUs (such as the electronic key ECU 7 and the door ECU 9) connected to the power supply cable 5.

For example, when the body ECU 8 receives the transmission signal having the hopping pattern P1 transmitted from the electronic key ECU 7 through the power supply cable 5 at the receiving section in the power supply IC 8a, it transmits command information for commanding locking or unlocking of the doors according to the command information from the electronic key ECU 7 included in the transmission signal from the transmitting section of the power supply IC 8a to the door ECU 9 as a transmission signal having a hopping pattern P2.

The door ECU 9 is a control unit for locking or unlocking the doors according to a command from the body ECU 8 and for transmitting information indicating that the doors are open (door information) to the body ECU 8 in the vehicle when the doors are open. It supplies power to internal circuits forming the ECU itself through a power supply IC 9a, receives the transmission signal having the hopping pattern P2 from the body ECU 8 at a receiving section 30 incorporated in the power supply IC 9a, controls a door lock actuator according to the command included in the transmission signal, and transmits the door information indicating the door open state to the power supply cable 5 as a transmission signal having a hopping pattern P3 from a transmitting section 20. Although not described above, the receiving section in the power supply IC 8a of the body ECU 8 is configured such that it can receive the transmission signal having the hopping pattern P3.

Figure 2:
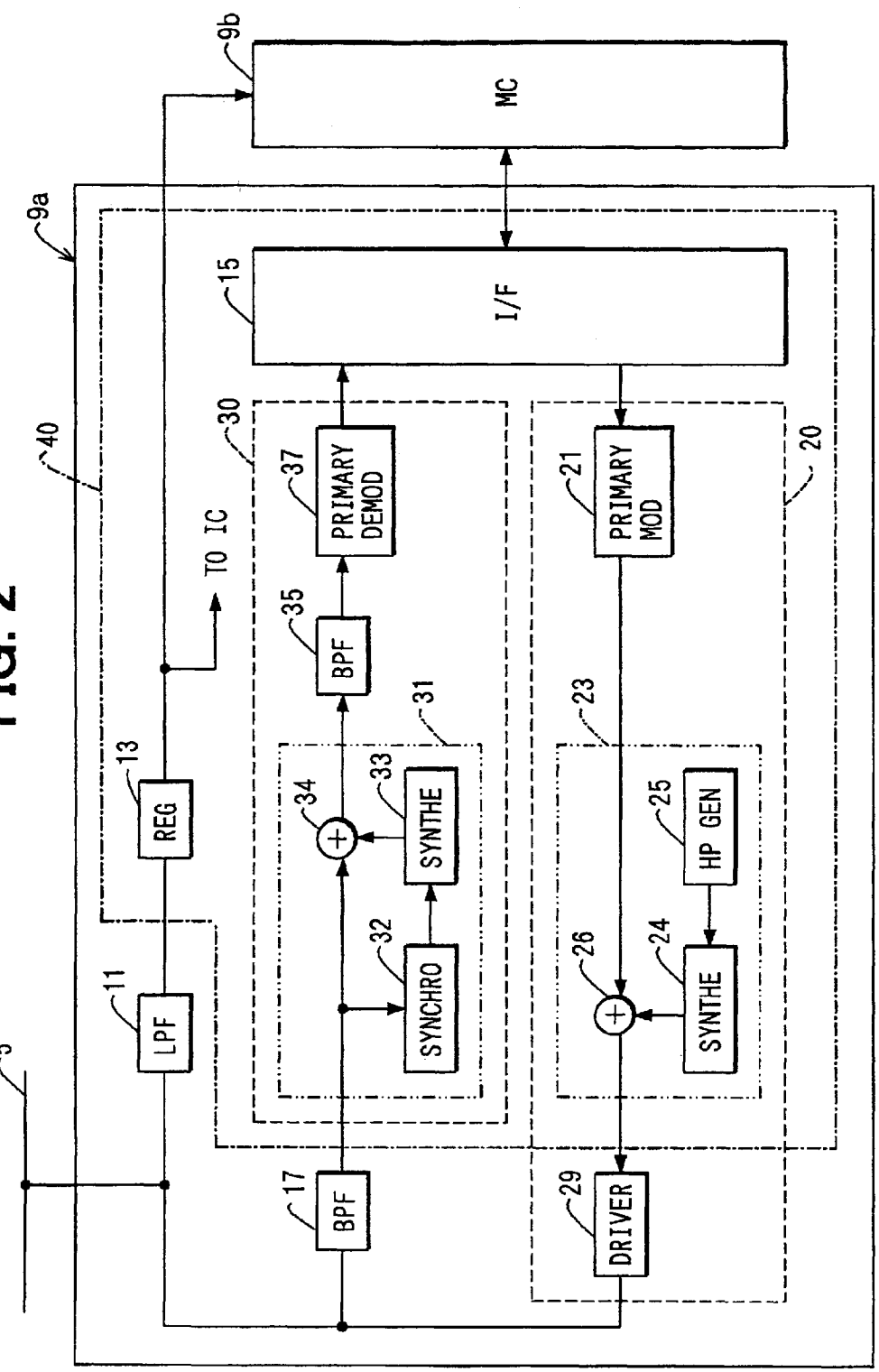
FIG. 2 is a block diagram showing the power supply integrated circuit shown in FIG. 1.

The power supply ICs 7a, 8a and 9a specifically have a configuration as shown in FIG. 2. FIG. 2 shows, as one example, a configuration of the power supply IC 9a of the door ECU 9 and a micro-controller 9b in the door ECU 9 that is connected to the power supply IC 9a.

As shown in FIG. 2, the power supply IC 9a has a low pass filter (LPF) 11, a regulator 13, an interface (I/F) circuit 15, a band pass filter (BPF) 17, a transmitting section 20, and a receiving section 30.

Specifically, the LPF 11 is connected to the power supply cable 5. It blocks passage of a communication signal as a transmission signal for data communication among input signals from the power supply cable 5 and selectively allows only the power supply voltage to pass, thereby inputting the power supply voltage to the regulator 13.

The regulator 13 converts the input power supply voltage from the LPF 11 into a DC constant voltage to be supplied to the internal circuits and supplies it to the internal circuits of the ECU (each part in the door ECU 9). That is, when the voltage of the battery 3 is 12 V and the internal circuits are driven with a voltage of 5 V for example, the power supply IC 9a picks up the power supply voltage of 12 V from the power supply cable with the LPF 11 whose cut-off frequency is sufficiently low and converts it into a DC constant voltage of 5 V with the regulator 13. The power supply IC 9a supplies the DC constant voltage obtained through the conversion to the transmitting section 20 and receiving section 30 in itself and also to the micro-controller 9b provided in the door ECU 9 and other parts (not shown) in the door ECU 9.

The transmitting section 20 of the power supply IC 9a is for outputting data (such as door information) output from the micro-controller 9b to another ECU (body ECU 8) in the vehicle as a frequency hopping type transmission signal.

The transmitting section 20 principally has a primary modulating circuit 21, a secondary modulating circuit 23, and a driver 29 for superposing an output signal from the secondary modulating circuit 23 on the power supply cable 5. The primary modulating circuit 21 is connected to the micro-controller 9b through the interface circuit 15 for converting signals transmitted and received between the micro-controller 9b and the transmitting section 20 and receiving section 30 into the formats of each other. The driver 29 is directly connected to the power supply cable 5.

The primary modulating circuit 21 is constituted by an oscillating part (not shown) for generating a carrier wave and a modulating part (not shown) for acquiring output data (data such as door information) from the micro-controller 9b through the interface circuit 15 and for modulating the carrier wave generated by the oscillating part using the data (not shown). It has a configuration in which a primary modulation signal obtained by modulating the carrier wave using the output data from the micro-controller 9b is input to the secondary modulating circuit 23.

The secondary modulating circuit 23 has a frequency synthesizer 24 as a variable oscillator configured such that the frequency of an output signal thereof can be varied, a hopping pattern (HP) generating part 25 for switching the oscillation frequency of the frequency synthesizer 24 in a predetermined pattern (hopping pattern P3), and a frequency mixer 26 for mixing an output signal from the frequency synthesizer 24 with the primary modulation signal input from the primary modulating circuit 21. The frequency of the primary modulation signal is converted by mixing it with the output signal from the frequency synthesizer 24 whose oscillation frequency is switched in the predetermined pattern at the frequency mixer 26. The resultant transmission signal (having the hopping pattern P3) is output to the driver 29 as a transmission signal to be input to the power supply cable 5. The driver 29 inputs the transmission signal input from the secondary modulating circuit 23 to the power supply cable 5 by superposing it on the power supply voltage.

The BPF 17 is for blocking passage of the power supply voltage among input signals from the power supply cable 5 and selectively allowing transmission signals from another ECU (the body ECU 8) to pass to input them to the receiving section 30.

The receiving section 30 that is provided downstream of the BPF 17 has a secondary demodulating circuit 31, a BPF 35, and a primary demodulating circuit 37 connected to the BPF 17 for receiving transmission signals transmitted from other ECUs in the vehicle according to the frequency hopping method.

The secondary demodulating circuit 31 has a synchronizing part 32, a frequency synthesizer 33, and a frequency mixer 34. The synchronizing part 32 establishes synchronization with the transmission signal input from the BPF 17 to generate a hopping pattern identical to the hopping pattern used for modulation at the transmitting section of the ECU that is the transmitter, the hopping pattern being input to the frequency synthesizer 33.

The secondary demodulating circuit 31 switches the oscillation frequency of the frequency synthesizer 33 in the same pattern as that of the transmitter (the hopping pattern P2 of the body ECU 8) in synchronism with the transmission signal based on a signal from the synchronizing part 32 and outputs a resultant oscillation signal to the frequency mixer 34. The signal is mixed with the transmission signal at the frequency mixer 34 to convert the frequency of the transmission signal that is then input to the BPF 35.

When frequency-converted transmission signals are input from the secondary demodulating circuit 31, the BPF 35 selectively outputs only a transmission signal having a predetermined frequency from the transmitter (the body ECU 8) which has been returned to the initial state as a result of reverse spreading among the transmission signals to the primary demodulating circuit 37.

When the primary demodulating circuit 37 receives the transmission signal from the body ECU 8 through the BPF 35, it restores the output data from the transmitter through demodulation and inputs it to the micro-controller 9b through the interface circuit 15.

When the transmitting section and receiving section are incorporated in the power supply IC as in the present embodiment, it is possible to make the ECU compact and to reduce the length of wires connecting parts thereof compared to a case in which the parts in the power supply IC 9*a* are formed separately and are mounted on a printed circuit board.

Therefore, the power supply IC 9*a* of the present embodiment makes it possible to prevent noise generated in a vehicle from entering an ECU at a wiring section and to improve the resistance of the ECU to noise consequently. It is also possible to minimize release of noise to other ECUs.

In addition, since the frequency hopping method that is excellent in anti-noise characteristics is employed as the data communication method of the power supply IC 9*a* of the present embodiment, the ECUs in the in-vehicle communication system 1 can communicate with each other without causing communication errors attributable to noise.

Although not described above, the power supply ICs 7*a* and 8*a* attached to the respective ECUs other than the door ECU 9 have the same basic internal structure as that of the power supply IC 9*a* described above in detail. However, when the power supply ICs are configured such that transmission signals from the respective ECUs have different hopping patterns as in the present embodiment, changes must be made accordingly in some settings associated with the hopping patterns of the transmitting sections in the power supply ICs 7*a* and 8*a*.

Since the electronic key ECU 7 is an ECU which receives no transmission signal from other ECUs, the power supply IC 7*a* attached to the same has a configuration in which it does not incorporate any part corresponding to the BPF 17 and receiving section 30 of the power supply IC 9*a*.

Further, since the body ECU 8 is an ECU which receives transmission signals having different hopping patterns from a plurality of ECUs (the electronic key ECU 7 and the door ECU 9), the power supply IC 8*a* attached to the same is equipped with receiving sections that can receive the transmission signals having the respective hopping patterns.

Specifically, in the case of the body ECU 8 of the present embodiment, the power supply IC 8*a* is equipped with a receiving section for receiving a transmission signal having the hopping pattern P1 (a version of the receiving section 30 in which the hopping pattern P1 is set in the synchronizing part 32) and a receiving section for receiving a transmission signal having the hopping pattern P3 (a version of the receiving section 30 in which the hopping pattern P3 is set in the synchronizing part 32).

Since it is difficult to use an element having a great inductance in a power supply IC, the LPF 11 and the BPFs 17 and 35 are constituted by active filters utilizing operational amplifiers whose apparent frequency characteristics can be made steeper by amplifying input signals.

The regulator 13 in the power supply IC of the present embodiment corresponds to the constant voltage power supply unit, and the LPF 11 and the BPF 17 of the present embodiment correspond to the filter unit. In the filter unit of the power supply IC, the section blocking passage of a transmission signal for data communication and selectively allowing the power supply voltage to pass between the power supply cable and the constant voltage power supply unit corresponds to the LPF 11 of the present embodiment, and the section blocking passage of the power supply voltage and selectively allowing a transmission signal for data communication to pass between the power supply cable and the data communication unit corresponds to the BPF 17.

In the power supply IC, the constant voltage power supply unit and the data communication unit are integrated to improve the resistance of an on-vehicle apparatus to noise and to allow the on-vehicle apparatus to be made compact. The invention is not limited to the above embodiment and can be carried out in various modes within the scope of the gist.

For example, only those sections enclosed by the dot-chain line in FIG. 2 may be integrated into an IC. Specifically, a power supply IC may be constituted by the regulator 13 as the constant voltage power supply unit and the interface circuit 15, the primary modulating section 21, the secondary modulating section 23, the secondary demodulating section 31, the BPF 35, and the primary demodulating section 37 as the data communication unit. In this case, a power supply IC 40 that is formed by the sections in the alternate long and short dash line, the LPF 11, the BPF 17, and the driver 29 may be assembled on a printed circuit board in place of the power supply IC 9*a* described in the above embodiment.

Although the frequency hopping method is employed as the communication method of the above embodiment, for example, it is possible to employ the direct spread (DS) method that is a similar spread spectrum method, and other methods of communication may be used as long as they provide anti-noise properties.

What is claimed is:

1. A power supply integrated circuit incorporated in an on-vehicle apparatus for performing data communication with another apparatus through a power supply cable provided in a vehicle and for supplying power to an internal circuit, the power supply integrated circuit comprising:

a constant voltage power supply unit for converting a power supply voltage into a DC constant voltage and supplying the same to the internal circuit; and a data communication unit for performing data communication with the another apparatus through the power supply cable.

2. A power supply integrated circuit according to claim 1, further comprising:

a first filter unit provided between the constant voltage power supply unit and the power supply cable for blocking a transmission signal for data communication and selectively allowing only the power supply voltage to pass between the power supply cable and the constant voltage power supply unit; and a second filter unit provided between the data communication unit and the power supply cable for blocking the power supply voltage and selectively allowing only a transmission signal to pass between the power supply cable and the data communication unit.

3. A power supply integrated circuit according to claim 1, wherein:

the data communication unit comprises a transmitting section for converting output data from the internal circuit into the transmission signal and transmitting it onto the power supply cable and a receiving section for restoring data from a transmission signal superposed on the power supply cable and inputting it to the internal circuit;

the second filter unit blocks the power supply voltage in a path of input of the transmission signal from the power supply cable to the receiving section to allow only the transmission signal to pass selectively; and the transmitting section is connected to the power supply cable to transmit the transmission signal onto the power supply cable without through a filter unit.

4. A power supply integrated circuit according to claim 1, wherein the data communication unit is configured such that it performs data communication with the another apparatus using a frequency hopping method.

* * * * *